(12) United States Patent
Butera

(10) Patent No.: US 11,068,857 B2
(45) Date of Patent: Jul. 20, 2021

(54) SYSTEMS AND METHODS FOR MANAGING POPULATIONS OF UTILITY POLES

(71) Applicant: OSMOSE UTILITIES SERVICES, INC., Peachtree City, GA (US)

(72) Inventor: Ben Butera, Atlanta, GA (US)

(73) Assignee: Osmose Utilities Services, Inc., Peachtree City, GA (US)

( * ) Notice: Subject to any disclaimer, the term of this patent is extended or adjusted under 35 U.S.C. 154(b) by 1153 days.

(21) Appl. No.: 15/186,332

(22) Filed: Jun. 17, 2016

(65) Prior Publication Data

US 2016/0371657 A1 Dec. 22, 2016

Related U.S. Application Data

(60) Provisional application No. 62/182,052, filed on Jun. 19, 2015.

(51) Int. Cl.
*G06Q 10/00* (2012.01)
*G06Q 10/06* (2012.01)
*G06Q 10/04* (2012.01)
*G01N 29/12* (2006.01)
*H04B 3/58* (2006.01)
*G01N 29/00* (2006.01)
*H04B 3/36* (2006.01)
*G06Q 50/16* (2012.01)
*H04B 3/54* (2006.01)

(52) U.S. Cl.
CPC ............ *G06Q 10/20* (2013.01); *G01N 29/00* (2013.01); *G01N 29/12* (2013.01); *G06Q 10/04* (2013.01); *G06Q 10/063* (2013.01); *H04B 3/58* (2013.01); *G06Q 50/16* (2013.01); *H04B 3/36* (2013.01); *H04B 3/54* (2013.01)

(58) Field of Classification Search
None
See application file for complete search history.

(56) References Cited

U.S. PATENT DOCUMENTS

| 6,088,659 | A | * | 7/2000 | Kelley | G01D 4/004 702/62 |
| 2012/0143383 | A1 | * | 6/2012 | Cooperrider | H04Q 9/00 700/295 |
| 2015/0355144 | A1 | * | 12/2015 | Bartuli | G01N 29/12 73/579 |

(Continued)

*Primary Examiner* — Gurkanwaljit Singh
(74) *Attorney, Agent, or Firm* — Troutman Pepper Hamilton Sanders LLP

(57) ABSTRACT

In an example implementation, a method includes receiving, at a processor, historical pole data records representing utility poles and having one or more pole attributes. Likewise, a method includes generating one or more pole subpopulations of historical pole data records having at least one common pole attribute. Further, the method includes performing a predictive algorithm on each pole subpopulation. Finally, the method includes determining, based on a predictive algorithm, the number of poles in the particular subpopulation that are likely to meet a rejection condition within a specified time frame. In another example implementation, a method includes receiving a sample pole data record representing a particular sample data pole and determining the likelihood of the particular sample utility pole meeting a rejection condition within a specified time frame.

10 Claims, 13 Drawing Sheets

(56) References Cited

U.S. PATENT DOCUMENTS

2016/0048934 A1* 2/2016 Gross .................. G06K 9/00637
705/313
2016/0109495 A1* 4/2016 Sterkel .................. G06F 17/212
702/62

* cited by examiner

SYSTEMS AND METHODS FOR MANAGING POPULATIONS OF UTILITY POLES

CROSS REFERENCE TO RELATED APPLICATION

This application claims the benefit, under 35 U.S.C. § 119(e), of U.S. Provisional Patent Application No. 62/182,052 filed Jun. 19, 2015, entitled "SYSTEMS AND METHODS FOR MANAGING POPULATIONS OF UTILITY POLES," the entire contents and substance of which is incorporated herein by reference in its entirety as if fully set forth below.

TECHNICAL FIELD

Aspects of the present disclosure relate to systems and methods for managing populations of utility pole plants, and more particularly, for predicting the future condition of utility poles based on their attributes.

BACKGROUND

Utility companies invest millions of dollars into building infrastructure to deliver services. For example, to deliver electricity, power companies must invest in large distribution networks which typically come in the form of transmission lines mounted on utility poles. Likewise, telecommunications companies may use utility poles to mount communications cables, such as fiber optic and coaxial cables. Utility poles may also support a wide variety of equipment such as transformers, street lights, traffic lights, cellular network antennas.

Due to the wide array of equipment and services supported by utility poles, it is of great economic value that the poles be appropriately maintained. However, over time, the poles will naturally degrade and eventually fail. Consequently, poles are regularly inspected to monitor for potential failures before they occur. But this is a difficult task as there are more than 150 million wood utility poles and many of them last in excess of 50 years before degrading to unacceptable levels. As such, currently, it is only economically viable for a company to inspect a small percentage of its utility poles every year. Thus, there is a need for a more cost-effective and far-reaching method of identifying potential future utility pole failures or rejections, that can make an assessment of all utility poles in the system, as opposed to just a small sample size at one given point in time.

SUMMARY

Some or all of the above needs may be addressed by certain implementations of the disclosed technology. According to an example implementation, a method is provided. The method may include receiving, at a processor, historical pole data records. According to some embodiments, each historical pole data record may represent a particular utility pole and may include data representative of one or more pole attributes for each particular utility pole. Further, the method may include generating, by the processor, one or more pole subpopulations. According to some embodiments, each pole subpopulation may be a subset of the historical pole data records having at least one common pole attribute. In some embodiments, each pole subpopulation may be a subset of the historical pole data records having all pole attributes in common. The method may further include performing, by the processor, a predictive algorithm on each pole subpopulation. Finally, the method may include determining, by the processor, and based on a predictive algorithm performed on a particular pole subpopulation of the one or more pole subpopulations, the number of poles in the particular subpopulation that are likely to meet a rejection condition within a specific time frame. According to some embodiments, the method may further include generating, by the processor and based on the determination of the number of poles in the particular subpopulation that are likely to meet a rejection condition within a specified time frame, a recommendation for utility pole replacement or restoration.

According to another example implementation, a method is provided. The method may include receiving, at a processor, historical pole data records. According to some embodiments, each historical pole data record may represent a particular utility pole and may include data representative of one or more pole attributes of a particular utility pole. Further, the method may include, receiving, at the processor, a sample pole data record. According to some embodiments, the same pole data record may represent a particular sample utility pole and may include data representative of one or more pole attributes of the particular sample utility pole. Further, the method may include generating, by the processor, a pole subpopulation. According to some embodiments, the pole subpopulation may be made up of historical pole data records matching the pole attributes of the sample pole data record. The method may further include performing, by the processor, a predictive algorithm on the pole subpopulation data. Finally, the method may comprise determining, by the processor, and based on the predictive algorithm, the likelihood of a particular sample utility pole meeting a rejection condition within a specified time frame.

According to another example implementation, a system is provided. The system may include a probe for obtaining data from a utility pole, a database having historical data, and at least one memory operatively coupled to at least one processor and configured for storing data and instructions that, when executed by the at least one processor, cause the system to receive customer asset data, update the database to include the received customer asset data, perform a first predictive analysis utilizing the customer asset data and historical data, and output a first recommendation in response to the first predictive analysis.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
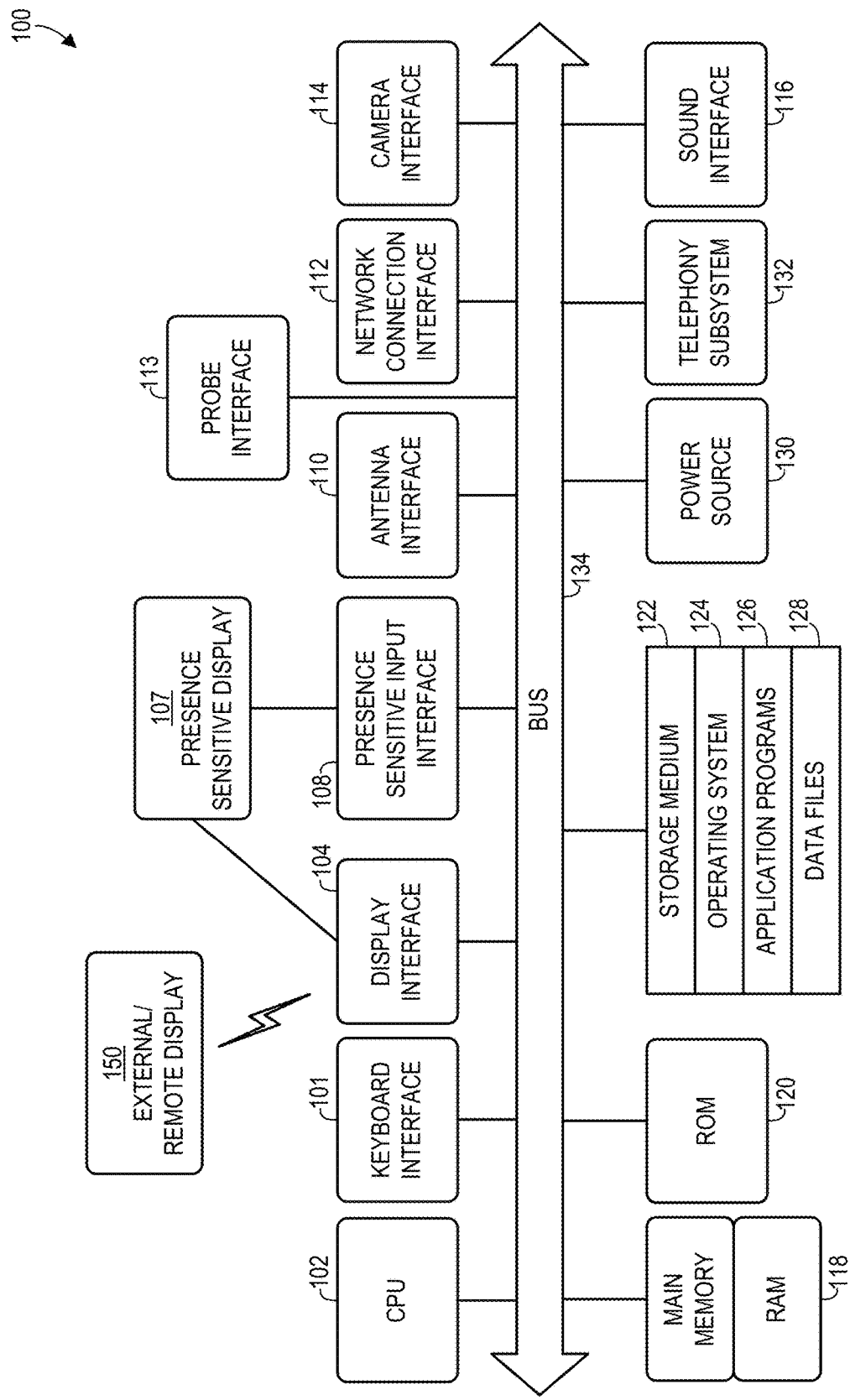
FIG. 1 is a block diagram of an illustrative computer system architecture, according to an example embodiment.

In some implementations of the disclosed technology, a utility pole management system may receive historical pole data records and make predictions regarding the number or percentage of utility poles of a certain type that are likely to meet a rejection condition within a specified time frame. Further, in some implementations of the disclosed technology, a utility pole management system may make predictions regarding what percentage of utility poles predicted to meet a rejection condition within the specified time frame may be restorable. According to some embodiments, a utility pole management system may make predictions regarding the percentage of utility poles that are not predicted to meet a rejection condition but are nonetheless in a state of decay. In some embodiments, utility poles in a condition of decay can also be serviceable or repairable.

Some implementations of the disclosed technology will be described more fully hereinafter with reference to the accompanying drawings. This disclosed technology may, however, be embodied in many different forms and should not be construed as limited to the implementations set forth herein. Although the current disclosure is primarily directed to the management of populations of utility poles, it should be understood that the systems and methods described herein may be effective in managing populations of other wood assets generally requiring continual inspection, maintenance, repair, and replacement and the present disclosure is not intended to be limited to management of utility poles.

In the following description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example implementations of the disclosed technology will now be described with reference to the accompanying figures.

As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a central processing unit (CPU) 102, where computer instructions are processed; a display interface 104 that acts as a communication interface and provides functions for rendering video, graphics, images, and texts on the display. In certain example implementations of the disclosed technology, the display interface 104 may be directly connected to a local display, such as a touch-screen display associated with a mobile computing device. In another example implementation, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 104 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 104 may be operatively coupled to a local display, such as a touch-screen display associated with a mobile device. In another example, the display interface 104 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 104 may wirelessly communicate, for example, via the network connection interface 112 such as a Wi-Fi transceiver to the external/remote display.

The computing device architecture 100 may include a keyboard interface 106 that provides a communication interface to a keyboard. In one example implementation, the computing device architecture 100 may include a presence-sensitive display interface 108 for connecting to a presence-sensitive display 107. According to certain example implementations of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 108, network connection interface 112, camera interface 114, sound interface 116, etc.,) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, Bluetooth-connected device, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. As mentioned above, the display interface 104 may be in communication with the network connection interface 112, for example, to provide information for display on a remote display that is not directly connected or attached to the system. In certain implementations, a probe interface 113 is provided that acts as a communication interface and provides functions for obtaining data from a probe. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components.

According to an example implementation, the computing device architecture 100 includes a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 128 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or wearable computer. In this example implementation, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
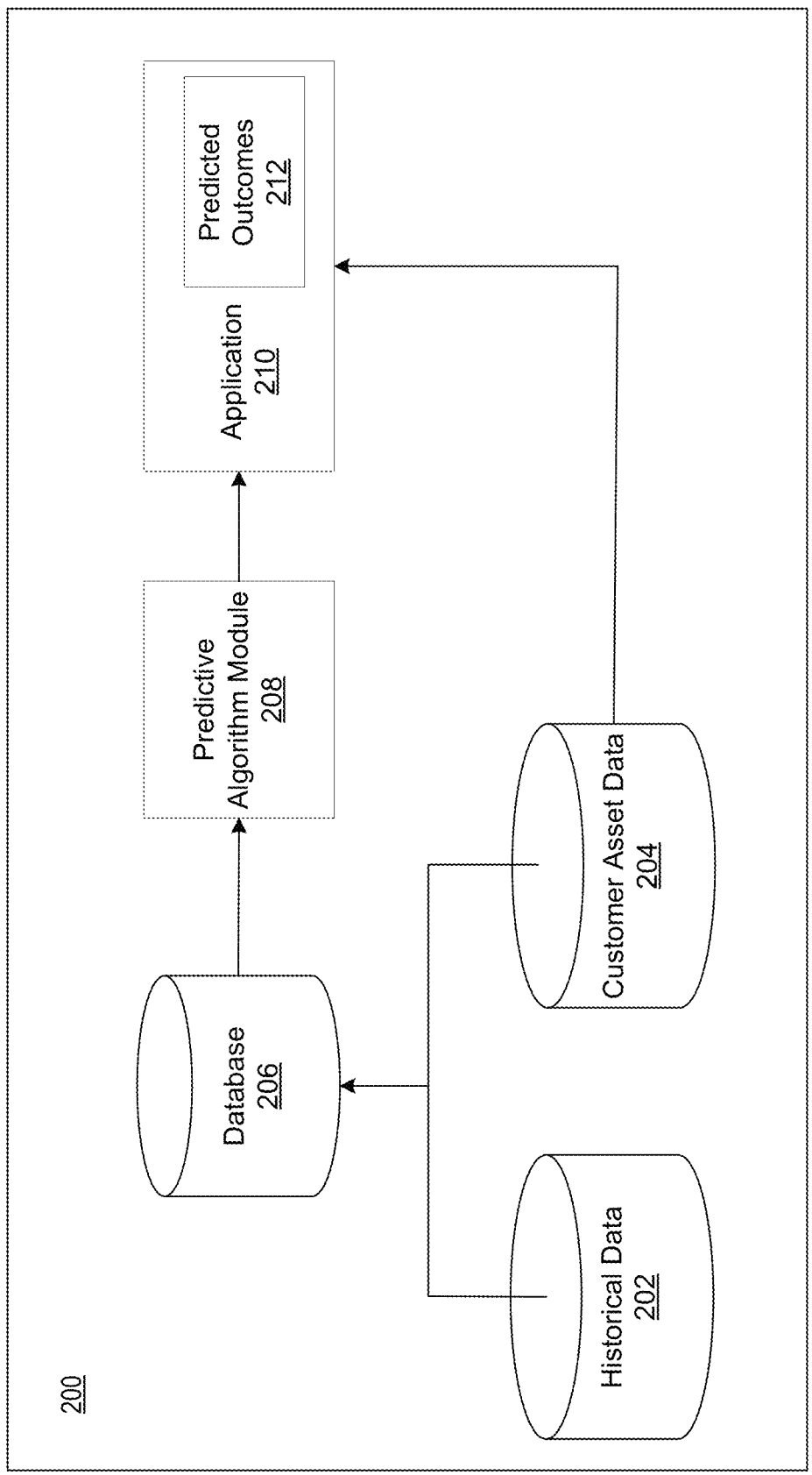
FIG. 2 is a system architecture of a utility pole management system, according to an example embodiment.

FIG. 2 is an overview of an exemplary architecture of a utility pole management system 200, according to some embodiments. As will be discussed, a utility pole management system can be used to predict future rejection conditions among a population of utility poles, according to some embodiments. In some embodiments, the utility pole management system 200 may include a database 202 storing a set of historical data and a database 204 storing a set of customer asset data. Historical data may include data records indicative of the features, attributes, and historical conditions of a set of assets (e.g., utility poles) that may belong to a plurality of different owners or customers. For example, historical data may include data indicative of the attributes or features of a set of utility poles and the degradation, repairs, and replacements of those utility poles over a period of time (e.g., the last 50 years). According to some embodiments, customer asset data may include data on a particular group of utility poles, for example, the set of currently deployed utility poles ("in-service") owned by a particular customer. Furthermore, customer asset data may include a set of data records pertaining to the customer assets, where each record provides information and attributes about a particular asset, such as the asset's location (e.g., GPS coordinates, zip code or the like), installation date or year, material, and other such features that will be described in greater detail below. In some embodiments, customer asset data 204 may be updated periodically or in real-time as the currently deployed assets of a customer change or experience repairs.

According to some embodiments, a database 206 can receive and/or store historical data and customer asset data from databases 202, 204. Though shown separately in FIG. 2, it will be understood that in some embodiments, databases 202, 204 may be simply replaced by a single database 206 in some embodiments, and the database 206 may receive historical data and customer asset data from another source, such as a remote computer device or a user input. Historical data may include historical pole data collected on a wide variety of utility pole types and may contain information indicative of the attributes or features of each utility pole, such as, for example, but not limited to, the age of the pole, the species of wood it is made from, the location of the pole, the decay zone of the pole, the program inspection type of the pole, the original treatment type of the pole, the age of the pole when it reached a rejection or failure condition, and much more. Customer asset data can include similar data regarding attributes and features of a customer's deployed or estimated utility pole assets. In some embodiments, a database of the system (e.g. database 202, 204, 206) may be implemented on a computing device and may utilize SQL or another suitable language for database management.

In some embodiments, the utility pole management system 200 may include a predictive algorithm module 208 that may include a library or database of pole condition prediction algorithms. According to some embodiments, the predictive algorithm module 208 may perform one or more predictive algorithms on the historical data and/or the customer asset data to generate predictions on future pole conditions of the customer assets. In some embodiments, the predictive algorithm module 208 may output the results of the predictive algorithms to an application 210. In some embodiments, the application 210 may include a user interface or dashboard that may allow a user to view and interact with the data and/or results of the pole condition predictive algorithm. According to some embodiments, the application 210 may output or display the predicted outcomes 212, on for example, a user interface. For example, the application 210 may generate reports and/or display the results. The system 200 may generate various categories of predicted outcomes 212, including for example, financial outcomes (e.g., budgets and predicted costs relating to predicted repairs or replacements), risk (e.g, volatility in costs), program valuation (e.g, PVRR, ROE, etc.), or an operational plan.

Figure 3A:
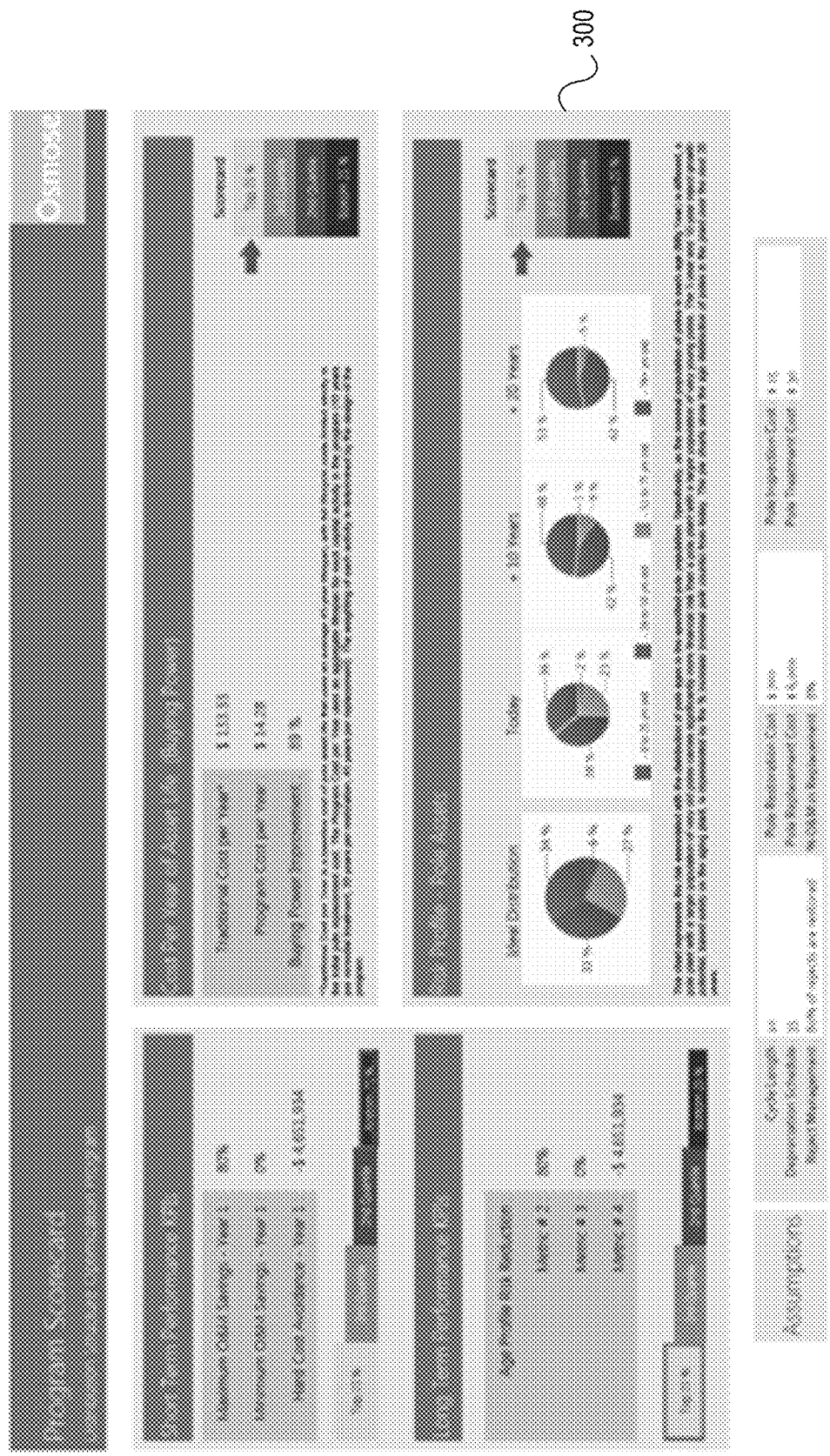
FIG. 3A-B are user interfaces displaying results of a method of predicting future rejection conditions among a population of utility poles, according to an example embodiment
Figure 3B:
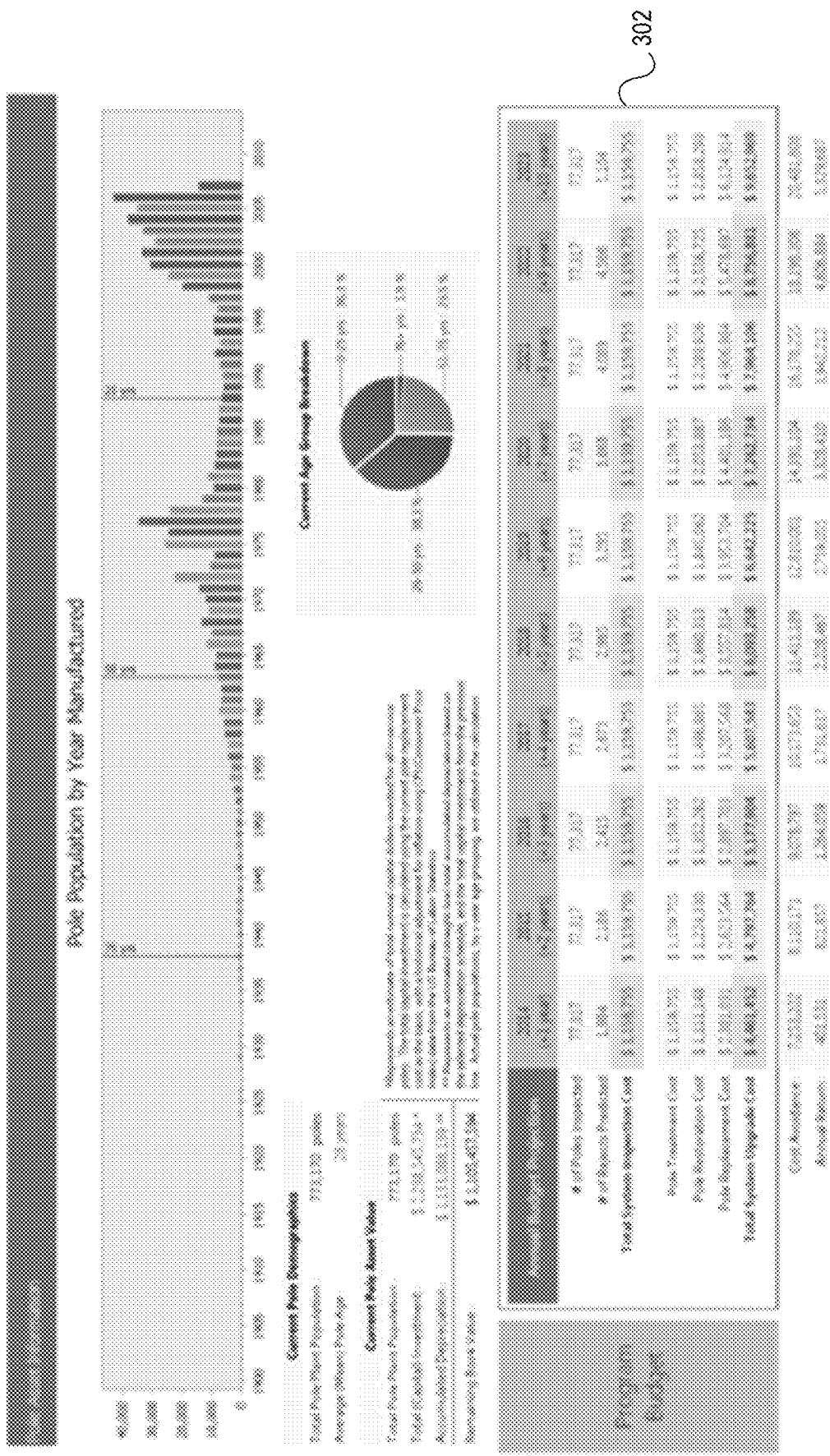

In some embodiments, the application 210 may receive (e.g., via user input) various parameters to model "what if" scenarios for different program and financial variables. For example, a user may input parameters such as, but not limited to, pole depreciation, cycle length, replacement cost, restoration cost, reject management (e.g., "80% Restore/20% Replace"), average inspection cost, average treatment cost, the percentage of poles treated, the percentage expense in replacement, the allowed rate of return, the number of poles replaced in the past year, and the inspection type. FIGS. 3A-B illustrate example embodiments of a dashboard or user interface 300, 302 that can display results and predictions generated by the application 210 and that are useful in planning for future utility pole maintenance and replacement programs. For example, the user interface 300, 302 can display the financial, risk, and asset condition outcomes for each "what if" scenario performed by the system 200.

To generate such financial predictions, it may first be necessary for the system 200 to generate predictions regarding the future condition of the set of utility poles at issue. In particular, it may be necessary for the system 200 to generate predictions regarding when one or more poles of the set of utility poles will be considered to be in a rejection condition. According to some embodiments, a rejection condition may be a condition of a utility pole that does not meet the strength requirements of the National Electrical Safety Code. More specifically, the NESC states that a pole should be rejected if the remaining strength is less than two-thirds of the original required strength. Thus, according to some embodiments of the present disclosure, the system 200 can determine that a utility pole is in a rejection condition if the utility pole's strength is predicted to be less than two-thirds of the originally required strength, as determined for example, by a predictive algorithm of the system 200. Embodiments of the present disclosure can be used to project the future condition of a pole based on a variety of maintenance program types. For example, in some embodiments, the system 200 can predict how many poles have no decay, how many poles are decayed but serviceable, and how many poles are below code strength requirements (i.e., are in a rejection condition).

Figure 4:
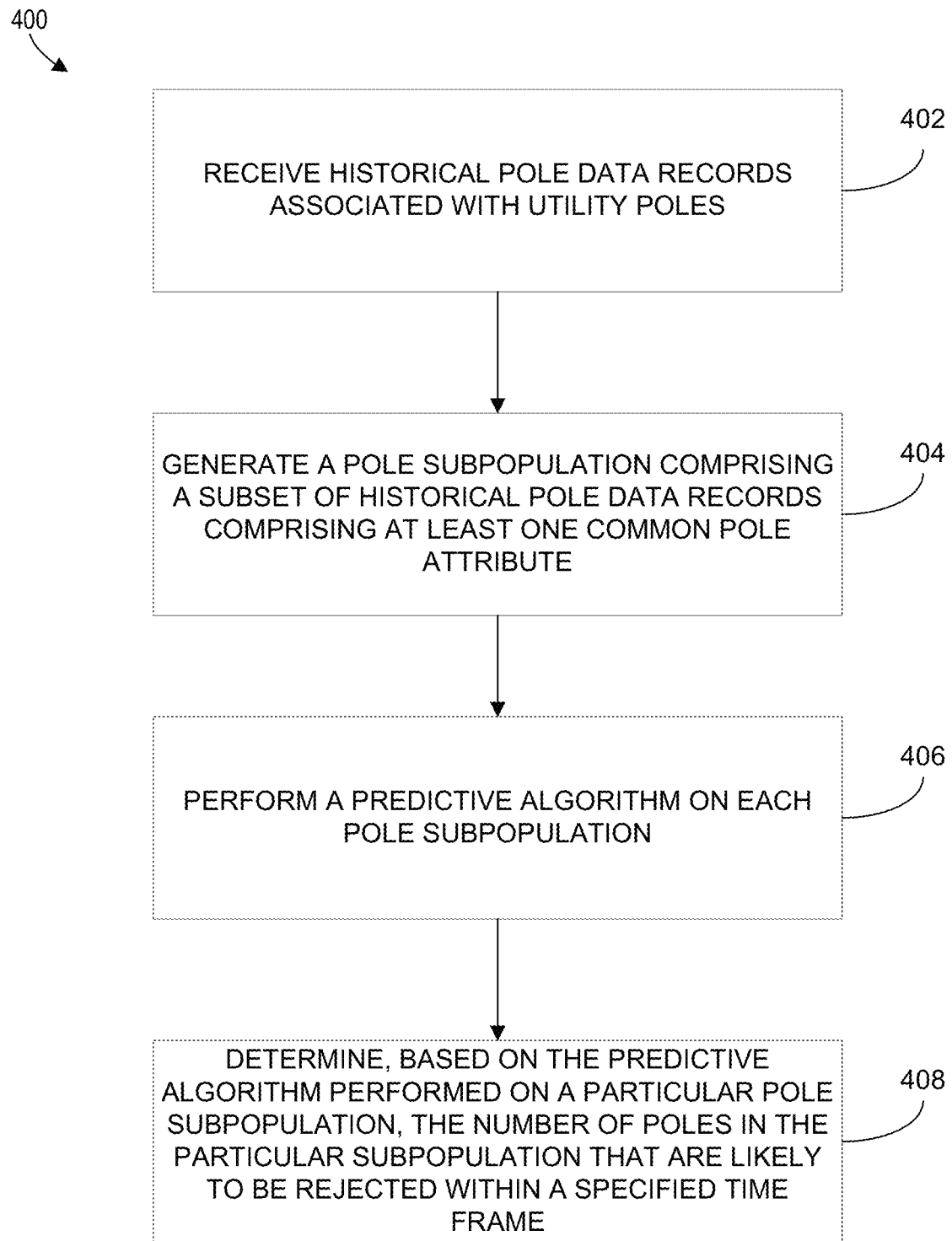
FIG. 4 is a method of predicting future rejection conditions among a population of utility poles, according to an example embodiment.

FIG. 4 is a flow diagram of a method 400 for predicting the number or percentage of utility poles that are likely to meet a rejection condition within a specified time frame, according to an example implementation. As shown in FIG. 4, and according to an example implementation, the method 400 can include receiving 402, by a processor, historical pole data records. According to some embodiments, each historical pole data record can represent a particular utility pole and each historical data pole record can include one or more pole attributes of the particular utility pole. Pole attributes can include, but are not limited to, for example, pole age (or year manufactured), decay zone, species of wood, program inspection type, original treatment type, previous treatment type, rejection age, job number, region, district, area, state, county, city, grid, line, substation, section, township, range, map number, feeder name, feeder number, circuit name, circuit number, supervisor, foreman, crew ID, Applicator ID, Week Ending Date, Current Day of Week, Date, GPS Timestamp, State Tracking ID, Location ID, GPS ID, Structure ID, Added Structure ID, Inspection ID, Condition ID, GPS coordinate, distance, bearing, pole number, Alt Pole number, Customer Data ID, Multiple Pole Desk, Owner, Manufacturer, Year Manufactured (actual or estimated), Length/Class (actual or estimated), Length, Class, Species/Material, Previous Cycle Information, Last Inspected By, Year Last Inspected, Previous Restored Year, Previous Restoration Method, Pole Type, RUS Codes, Pole Accessibility, Original G/L Circumference, SR Circumference—this cycle, Shell Rot No Reduction, Strength Required, StrengthCalc, LoadCalc, Inspection and Treatment Activities, Inspection Comments, Can Not Treat Reason, Primary Rejection Reason, Priority Pole, Restorable—Decay Condition, Restorable—Customer Spec, Recommended Restoration Method, Restoration Height, Location, Cross Street, RUS Code Billable, LoadCalc Billable, Quantity, Measured Value, Maintenance ID, DuraFume, Flurods, MITC Fume, Anchor Eye Inspect, Anchor Eye Inspect—Corroded, Anchor Eye Inspect—Good, Anchor Eye Inspect—Rejected, Apply Fireguard, Clear Buried Anchor, Danger Signs Install, Danger Signs Remove, Ground Resistance Measurement, Ground Rod Install, Groundwire Molding Install, Groundwire Repair, Guy Marker Install—Customer, Guy Marker Install—Company, Guy Wire Tail Trim, Line Clearance Measurement, Pole Number Install, Pole Reflector Install, Pole Stencil Install, Riser Guard Install, Step Removal, Visibility Strips Install, Hourly Rate, Hourly Rate—Crew Member, Hourly Rate—Crew Member OT, Hourly Rate—Foreman, Hourly Rate—Foreman OT, Hourly Rate—Foreman and Truck, and Hourly Rate—Truck.

The method 400 can include generating 404 one or more pole subpopulations, wherein each pole subpopulation is made up of a subset of the historical pole data records having at least one common pole attribute. For example, a pole subpopulation could be made up of all of the pole records where the species of wood is southern yellow pine and the pole age is 10 years. In some embodiments, historical pole data records can be part of many distinct but overlapping pole subpopulations (e.g., a pole having attributes X, Y, and Z may be included in a first pole subpopulation including attributes X and Y, and a second pole subpopulation including attributes Y and Z). According to some embodiments, each pole subpopulation may be made up of a subset of the historical pole data records having all common attributes, such that each historical pole data record is only part of one pole subpopulation (e.g., a pole having attributes X, Y, and Z is only in a first subpopulation including attributes X, Y, and Z).

The method can include performing 406, by the processor, a predictive algorithm on each pole subpopulation. Thus, the method may include separately analyzing data on each set of utility poles that have similar characteristics (e.g., age, wood species type, decay zone).

In some embodiments, the predictive algorithm can assign a weight factor or coefficient to each pole attribute that may represent the significance of each pole attribute's effect in contributing to that pole subpopulation's degradation towards reaching a rejection condition. The weighting of these factors may vary from subpopulation to subpopulation. For example, yellow pine may rot significantly faster in decay zone 1 than it does in decay zone 2, and thus the coefficients would be different in each of those scenarios. It will be understood by those of skill in the art that these weighting factors may change over time as the number of historical pole data records changes, and that in general, having a greater number of historical pole data records will lead to more accurate future predictions.

The method can include determining 408, by the processor and based on the predictive algorithm performed on data of a particular pole subpopulation of the one or more subpopulations, the number of poles in the particular subpopulation that are likely to meet a rejection condition in a specified time frame.

According to some embodiments, the disclosed system may use a combination of methodologies to create, test, optimize, and execute predictive algorithms. In some embodiments, these methodologies can include, for example: an ANOVA study on individual variables, a covariance study on multiple variables, construction of multinomial regression structures using correlation and variance study results, solving of final algorithm variable coefficients using a genetic algorithm or simulated annealing, construction and training of neural networks, construction and training of random decision forests, training of support vector machine algorithms, logistical regressions, the use of gradient boosting in regressions, and the application of rejection sampling to customized historical datasets using an inverse distance weighting algorithm. It should be understood that various embodiments, the predictive algorithms described herein may use some or all of these techniques, as well as other statistical, mathematical, modeling, or other such techniques known in the art.

Figure 5:
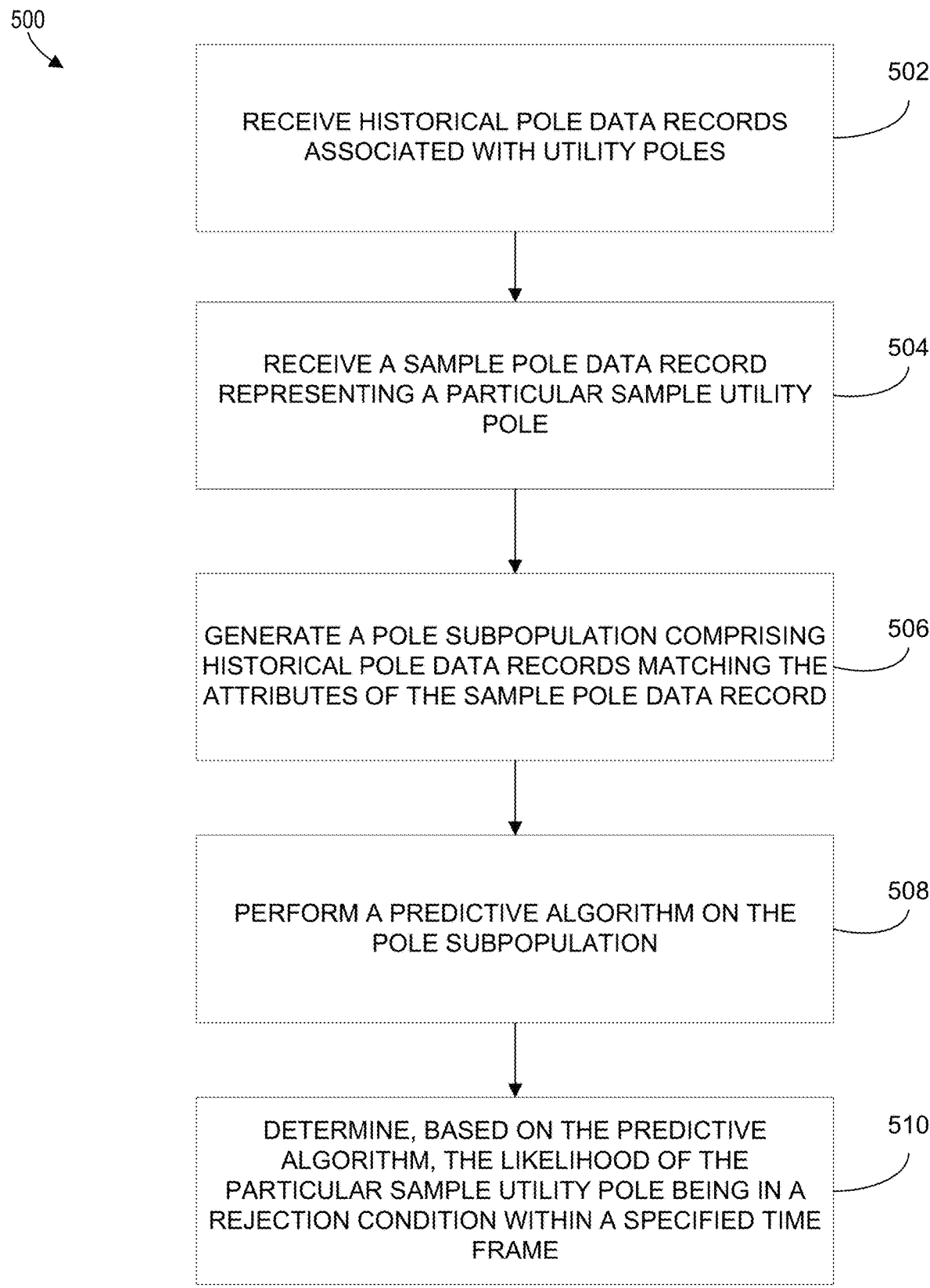
FIG. 5 is a method of predicting future rejection conditions among a population of utility poles, according to an example embodiment.

FIG. 5 is a flowchart of a method 500 for predicting the likelihood of a particular individual utility pole meeting a rejection condition within a specified time frame, according to an example implementation. As shown in FIG. 5, and according to an example implementation, the method 500 can include receiving 502, by a processor, historical pole data records. The method 500 can include receiving 504, by the processor, a sample pole data record representing a particular sample utility pole. For example, the sample utility pole may be a particular utility pole in which it is desirable to determine the probable remaining useful life. The method 500 can include generating 506, by the processor, a pole subpopulation. According to some embodiments, the pole subpopulation may include poles corresponding to historical data records including pole attributes that match the pole attributes of the sample pole data record. For example, if the sample utility pole is a yellow pine that is 20 years old in decay zone 3, then the subpopulation may be made up of historical pole data records of yellow pine utility poles that are 20 years old in decay zone 3. The method 500 can include performing 508, by the processor, a predictive algorithm on the pole subpopulation. For example, the processor can generate a rejection curve that displays the percentage of poles of the subpopulation that are in, or are predicted to be in, a rejection condition across a specified time period. The method 500 can include determining 510, by the processor, the likelihood of the particular sample utility pole meeting a rejection condition within a specified time frame. According to some embodiments, the processor can make this determination based on the predictive algorithm of the subpopulation. For example, the processor may determine that there is a 50% probability that the sample utility pole will meet a rejection condition after 20 years, and an 80% probability after 40 years. The method 500 may be repeated several times using sample pole data records representing different individual utility poles of a group of utility poles to assess the future condition of the group of utility poles.

In some embodiments, the disclosed systems and methods may also include generating a predicted degradation curve for a particular type of utility pole, or a utility pole having a particular set of pole attributes, by performing a predictive algorithm on the data records of utility poles having similar features. A degradation curve can show the predicted state of the utility pole over time, and predict, for example, at what point the utility pole will meet a rejection condition, at what point the utility pole will be in a condition where restoration may be necessary, or at what point the utility pole's condition may be beyond repair. In some embodiments, an algorithm may be used on utility pole data records with the same set of pole attributes, but with the additional attribute of having been restored or repaired at some point in time. According to some embodiments, the system may utilize the algorithm of utility pole data records having a repair/restoration attribute to perform a prediction on the increase in lifespan of a utility pole having similar features, if such a repair were to be performed on that utility pole. In some embodiments, a modified degradation curve for the utility pole may be generated based on the predicted increase in lifespan resulting from a similar repair or restoration being performed on the utility pole.

Figure 6:
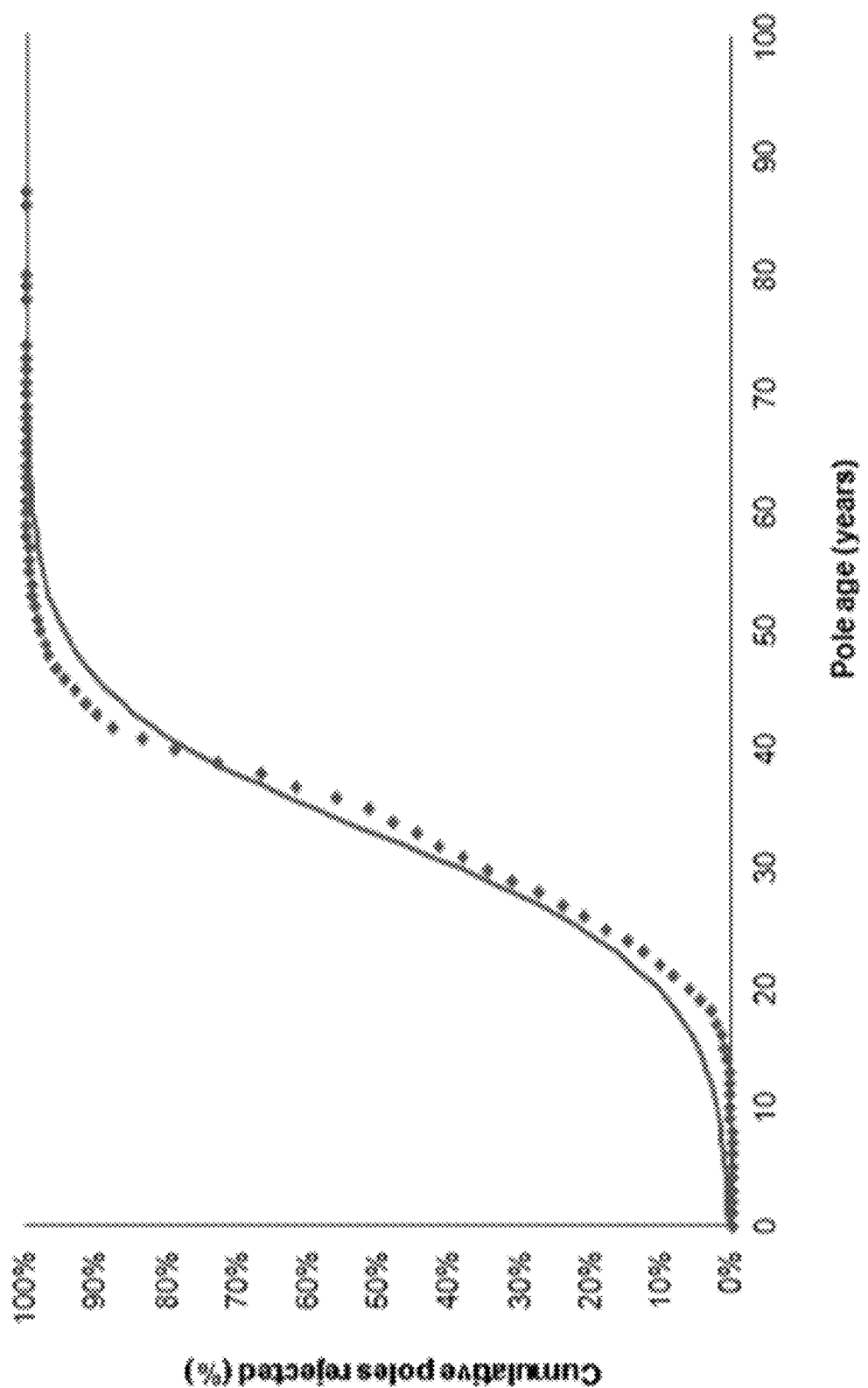
FIG. 6 is a reject curve of rejected poles, according to an example embodiment.
Figure 7:
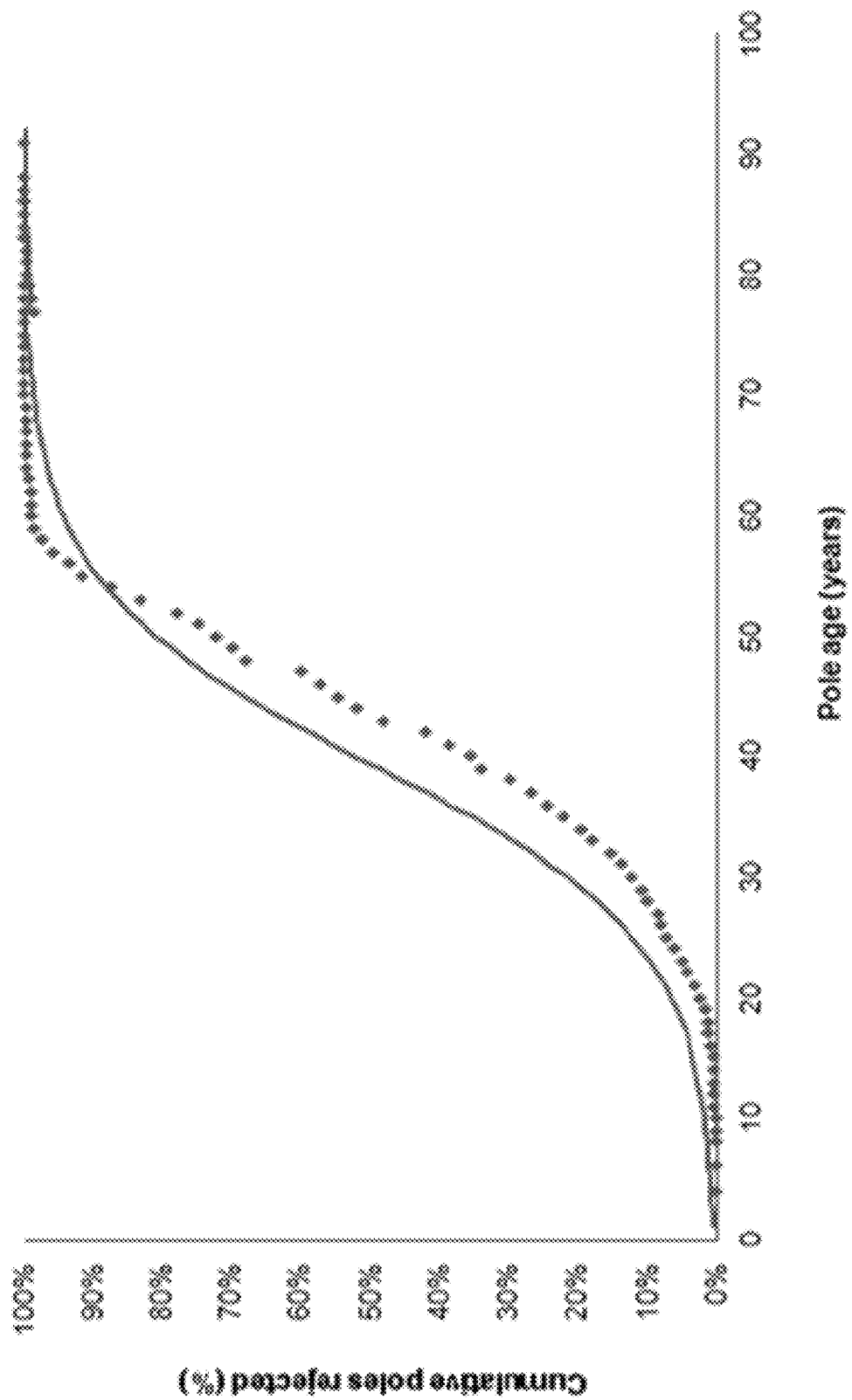
FIG. 7 is a reject curve of rejected poles, according to an example embodiment.
Figure 8:
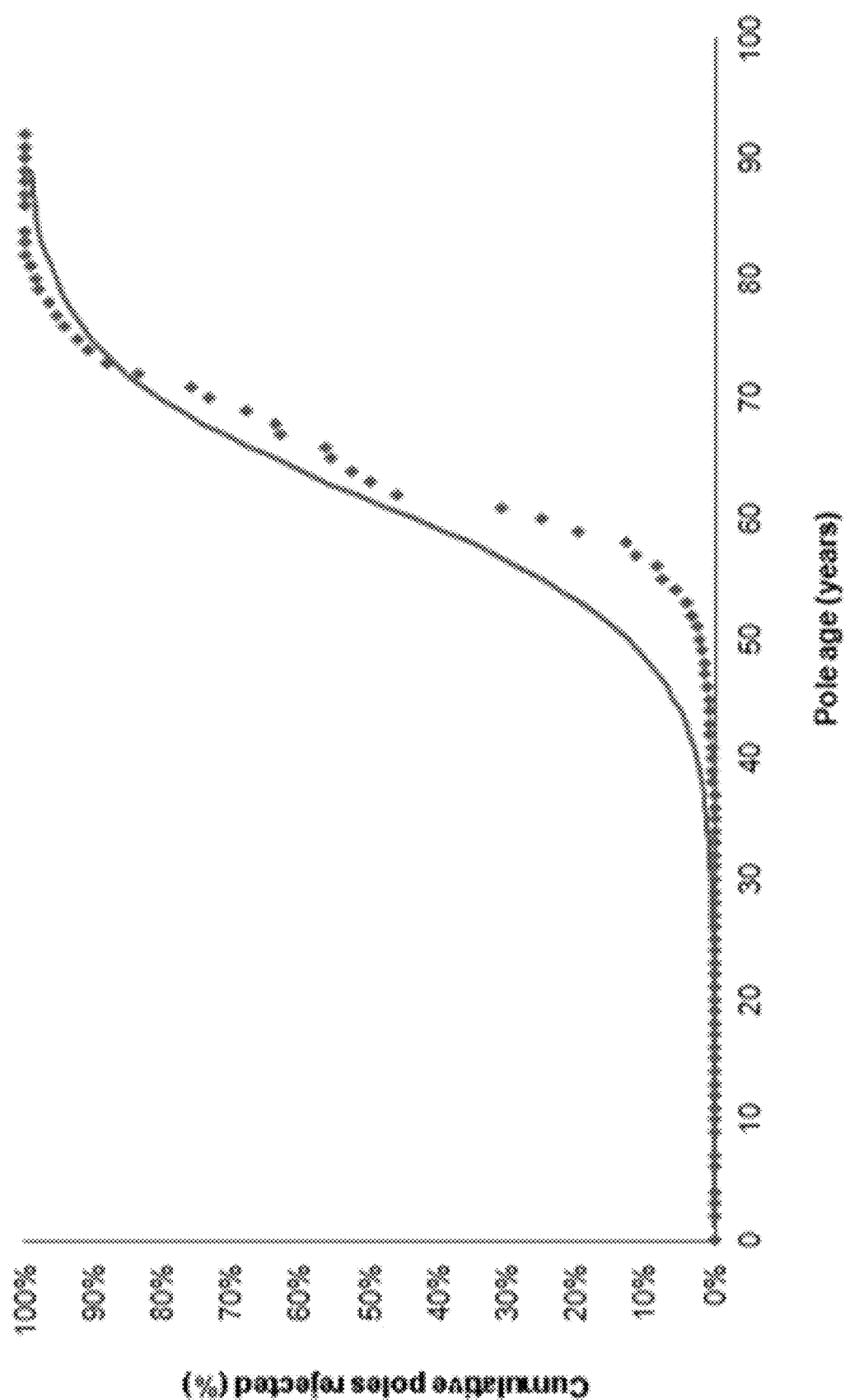
FIG. 8 is a reject curve of rejected poles, according to an example embodiment.
Figure 9:
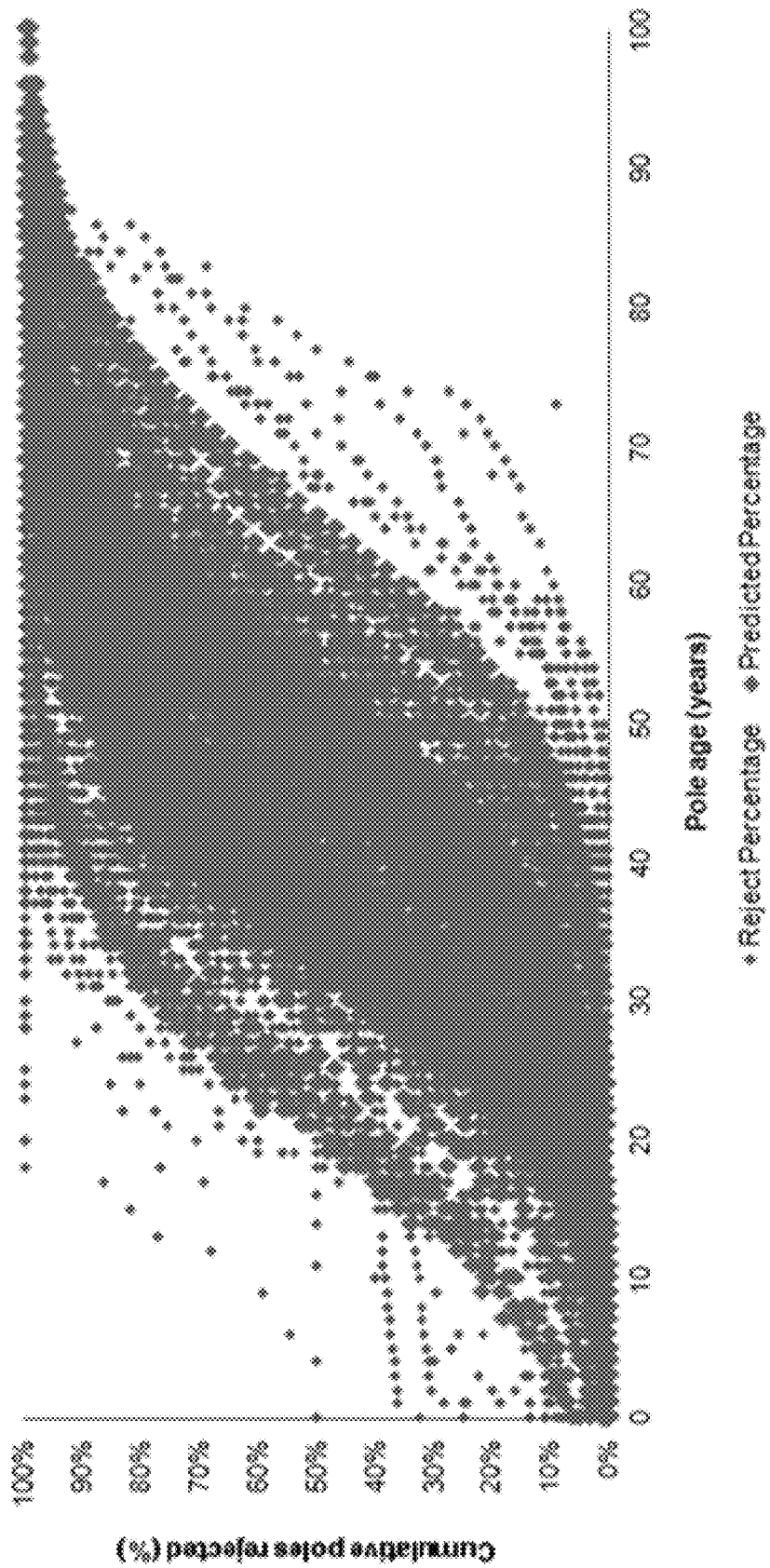
FIG. 9 is a cumulative series of reject curves of rejected poles, according to an example embodiment.

In accordance with some embodiments, the methods described herein may generate a reject curve similar to the examples shown in FIGS. 6-9, which show the cumulative poles rejected (%) over a span of 100 years. FIG. 6 shows an example rejection curve of cumulative rejections by age for a population of 266,000 utility poles having the features (with respective coefficients in parentheses): Decay Zone 5 (−0.46), Program Type F (−0.93), Pentacholorophenol (−1.35), Southern Pine (−1.35), and Not Previously Treated (−1.35). From the graph shown in FIG. 6, it can be seen that roughly 70% of this subpopulation (i.e., decay zone 5, F, Pentacholorophenol, Southern Pine, not previously treated) will be in a rejection condition after approximately 40 years. FIGS. 7 and 8 show similar examples of rejection curves for different subpopulations of utility poles. FIG. 7 shows an example rejection curve of cumulative rejections by age for a population of 224,000 utility poles having the features: Decay Zone 2 (−0.32), Program Type F (−1.44), Pentacholophenol (−1.44), Southern Pine (−1.44) and Not Previously Treated (−1.44). FIG. 8 shows an example rejection curve of cumulative rejections by age for a population of 33,000 utility poles having the features: Decay Zone 2 (−2.04), Program Type P2 (−0.84), Pentacholorphenol (−2.67), Western Red Dedar (−3.65), and Not Previously Treated (−1.35). According to some embodiments, some or all rejection curves for different subpopulations of pole data records may be aggregated to form a total picture of all of the utility poles in the system. For example, FIG. 9 shows an example of a cumulative distribution function, or, the cumulative rejection curves across various subpopulations of utility poles. According to some embodiments, the variable coefficients may continuously change as additional inspection data is introduced into the model, further optimizing the algorithm. Rejection curves such as these may be used in planning utility pole inspection, repair, and replacement programs.

It will be understood by those of skill in the art, that the methods disclosed herein may be utilized to make predictions regarding the future condition of one or more utility poles in a manner that will enable a company to implement improved pole maintenance and replacement programs. Furthermore, it will be understood that these methods and systems disclosed herein may be modified or adapted to not only generate predictions with regards to rejection conditions, but with regard to many other conditions as well. For example, the methods and systems may be used to estimate or predict what percentage of actual or predicted utility poles meeting a rejection condition in a specified time frame are predicted to be in a condition such that they are restorable. According to some embodiments, a utility pole may be restorable if it is predicted to meet the structural engineering criteria that permit the installation of a steel truss restoration system, per applicable construction and engineering codes. In some embodiments, a utility pole may be a restoration candidate if it has adequate sound wood above ground to transfer the load from the pole to the steel truss. Furthermore, the methods and systems may be utilized to determine what percentage of the actual or predicted utility poles that do not meet the rejection condition in a specified time frame, will nonetheless be predicted to be in a condition of decay. In some embodiments, the methods disclosed herein can identify which particular utility poles of a given subpopulation are most likely to meet a rejection condition and thus, inspectors can focus their attention on those particular poles. For example, in some embodiments, the system can apply a discrete probability of a specific utility pole meeting a rejection condition at any future specified year, using the methodologies and criteria specified herein.

According to some embodiments, a predictive algorithm as disclosed herein can be an algorithm designed to make a single prediction. In some embodiments, the results of one or more algorithms may be combined. In some embodiments, a predictive algorithm may utilize an assumption that any utility pole that will be replaced in the future will be replaced with a new utility pole having the exact same pole attributes, other than pole age. In some embodiments, a predictive algorithm may utilize an assumption that any utility pole that will be replaced in the future will be replaced with a new utility pole having a specific set of ascribed attributes. According to some embodiments, the ascribed attributes can be based on a pole purchasing policy that is either currently in use or is under evaluation. In some embodiments, the systems and methods presented herein can generate reports that provide information such as, but not limited to, the number, type, and/or percentage of utility poles that are likely to need to be replaced or restored within a specified number of years, the predicted cost of replacing and/or repairing the necessary utility poles in a given year, indications of the pole attributes that lead to the longest useful life, indications of the pole attributes that provide the best value per dollar spent, and various other reports, statistics and data that would be useful in managing the maintenance of a large number of utility pole plants.

Furthermore, embodiments of the present disclosure can provide models of the financial impacts relating to the predicted degradation of a utility pole or a set of utility poles. Such models may assist the owner of the utility poles in planning replacement programs and in making financial decisions. According to some embodiments, the financial impacts modeled by the system can include the Rate Base, CapEx budgets, and OpEx budgets. As previously described with respect to FIG. 3, an application 210 of the present disclosure can enable a user to run various "what if" scenarios for different program and financial variables, such as for example, inspection type, cycle times, costs, and cost of capital. In some embodiments, the system may be configured to output various financial predictions, including, but not limited to: 1) program/investment NPV, FV, PI, ROE, PVRR, 2) risk metrics such as i) expected volatility in future required CAPEX and other expenditures and ii) unmitigated operational risks (e.g., unobserved reject rate, exposure rates), 3) (future) annual inspection, restoration and replacement budgets, 4) asset lifecycle costs and (cost) efficiency metrics, and 5) regulatory metrics/KPIs such as present value of revenue requirements (PRVV). Such financial predictions, tools, and reports can assist utility pole owners in optimizing the financial aspect of utility pole management programs by facilitating optimal return on equity, continuous recapitalization and efficient through rates, efficient capital allocation, risk management (e.g., budget volatility, cost control/hedge, overall program stability), and understanding of black swans (i.e. correlations amongst pole failures).

According to some embodiments, a utility pole management system 200 may include a real-time decision framework that can utilize the systems and methods described herein. For example, according to some embodiments, a real-time decision framework can be integrated into a system that utilizes the prediction capabilities described herein to make real-time predictions about utility poles that either are or will be in a rejection condition or in need of repair. Therefore, in some embodiments, a system of the present disclosure can be capable of outputting notifications and other data relating to real-time pole conditions to a mobile device of the service technicians. In some embodiments, responsive to receiving the notifications and other data, the mobile device of the service technician can display instructions or other information regarding which utility poles should be inspected, repaired or replaced. Accordingly, a real time decision framework can enable the real time prioritization of inspections, repairs and replacements of utility poles.

Figure 10:
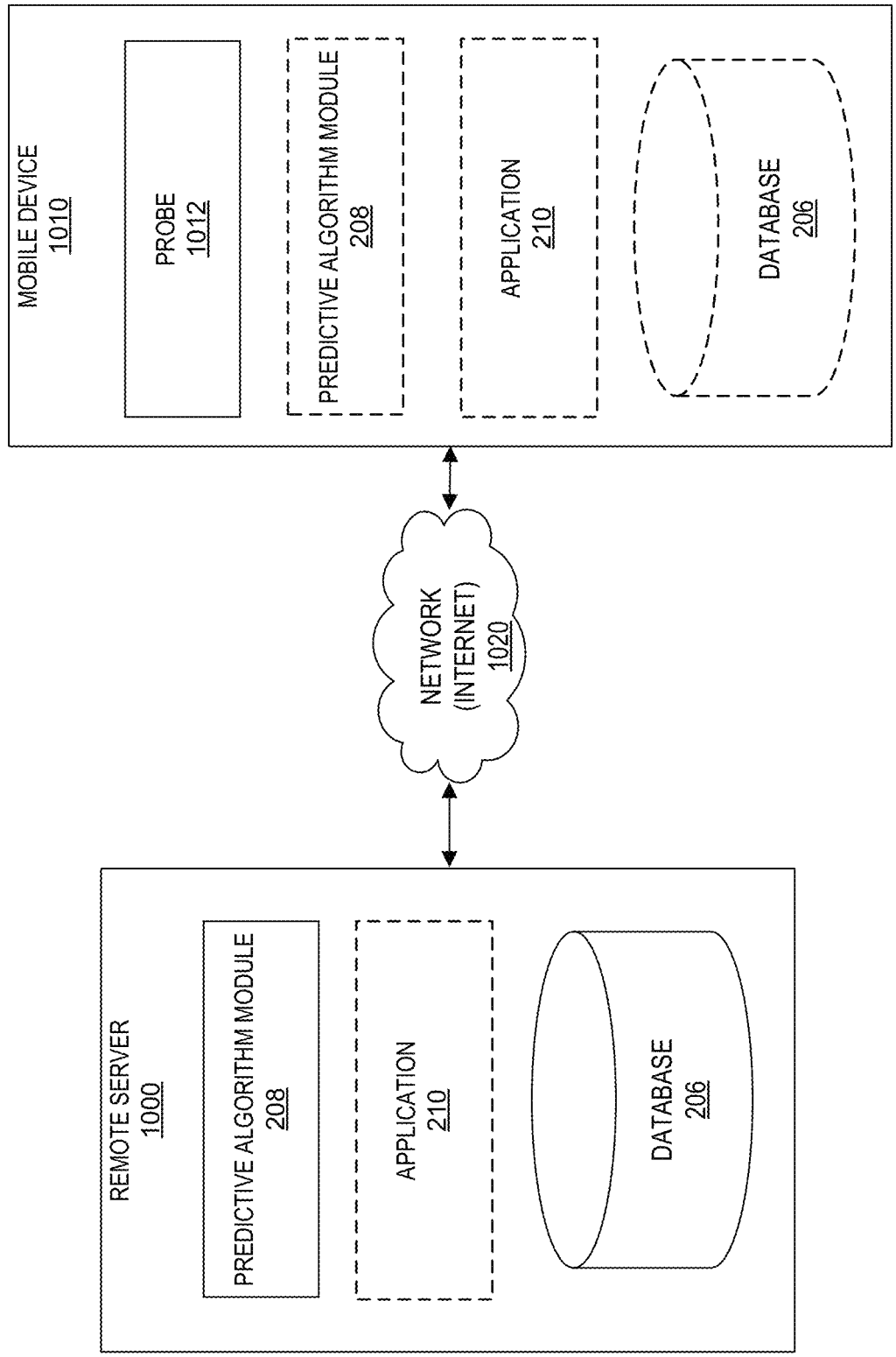
FIG. 10 illustrates a block diagram of utility pole management system, according to an example embodiment.

As shown in FIG. 10, according to some embodiments, a real-time decision framework may be enabled by a utility pole management system 200 that include a remote server 1000 that is in communication with a mobile device 1010 via a network 1020 (e.g., the internet). A mobile device 1010 can be, for example, a laptop, tablet computer, or mobile phone of a technician that may be connected to one or more probes or sensors. Generally speaking, the mobile device 1010 may collect data in real-time, either through one or more probes and/or sensors that may be integrated with the mobile device 1010, or through data entry of a technician observing the condition of a particular utility pole either visually or using a detached probe or sensor. Newly gathered data may be added to the database 206 of the utility pole management system 200, and the predictive algorithm module 208 may output new predictions or recommended actions based on the updated data.

According to some embodiments, either or both of the remote server 1000 and the mobile device 1010 may include some or all of the elements of the computing device architecture 100 of FIG. 1. According to some embodiments, the remote server 1000 may include some or all aspects of the utility pole management system 200 shown in FIG. 2. In some embodiments, the remote server 1000 may include a database 206, which may comprise data records including historical data 202 and customer asset data 204. The remote server 1000 may update customer asset data 204 in the database 206 in response to receiving new customer asset data from, for example, one or more mobile devices 1010 (e.g., in response to technicians taking measurements from utility poles in the field). Furthermore, in some embodiments, the remote server 1000 may include a predictive algorithm module 208 for performing predictive algorithms as described above. According to some embodiments, in response to receiving measurements or an updated asset data record from a mobile device 1010, the remote server 1000 may execute instructions to cause the predictive algorithm module 208 to perform a predictive analysis using the updated data. Thus, in this way, the mobile computing device can output a real-time solution or prediction of utility pole conditions. According to some embodiments, the real-time solution or prediction can be used to instruct a technician one or more decisions, such as for example, but not limited to, what maintenance(s) to perform, what other maintenance actions should be taken, the future date at which other maintenance(s), repair(s), or restoration(s) should be performed, and the future date at which the asset should be replaced. Such instructions or recommendations may be sent from the remote server 1000 to the mobile device 1010 for display to a user. In some embodiments, the remote server 1000 may include an application 210 for generating and displaying reports and other date and for allowing a user to interface with the utility pole management system 200 and run "what if" scenarios as described above.

According to some embodiments, the mobile device 1010 may include a probe 1012 for sensing and collecting data measurements from utility poles or other assets. In some embodiments, a probe 1010 may be a device that may be designed to be inserted into a utility pole to obtain measurements or other data. For example, in some embodiments, the probe 1012 may be the tool described in U.S. patent application Ser. No. 14/625,303. In some embodiments, a probe 1010 may be capable of measuring the hardness, thickness, moisture content, temperature, or other such aspects of a utility pole. In some embodiments, a probe 1010 may be capable of capturing an external or internal image of a portion of a utility pole. In some embodiments, a probe 1010 may be capable of detecting weaknesses, rot, holes, or other damage to a utility pole 1010. According to some embodiments, a customer asset data record of the customer asset data 204 may be updated in response to the measurements obtained by the probe 1012 of the mobile device 1010. In some embodiments, the mobile device 1010 may transmit the measurements to the remote server 1000 and the remote server 1000 may update the customer asset date record in the database 206. In some embodiments, the mobile device 1010 may include a local copy of the database 206 and it may update a customer asset data record on the mobile device 1010. In some embodiments, the mobile device 1010 may receive updates to the local copy of the database 206 from the remote server 1000. For example, a first mobile device 1010 may receive newly acquired utility pole data, measurements, or one or more updated asset data records from the remote server 1000, in response to the remote server 1000 receiving the new data from a second mobile device 1010. Furthermore, in some embodiments, a mobile device 1010 may include either or both of a predictive algorithm module 208 and an application 210. Accordingly, in some embodiments, a mobile device 1010 may be enabled to locally update database 206 records, perform a new predictive analysis on the updated data, and output results or recommendations through the application 210, without having to communicate with the remote server 1000. In some embodiments, the mobile device 1010 may periodically communicate with the remote server 1000 to send the remote server the probe measurements or updated asset data record. In some embodiments, the mobile device 1010 may be in constant communication with the remote server 1000, provided that a network connection 1020 is available.

Figure 11:
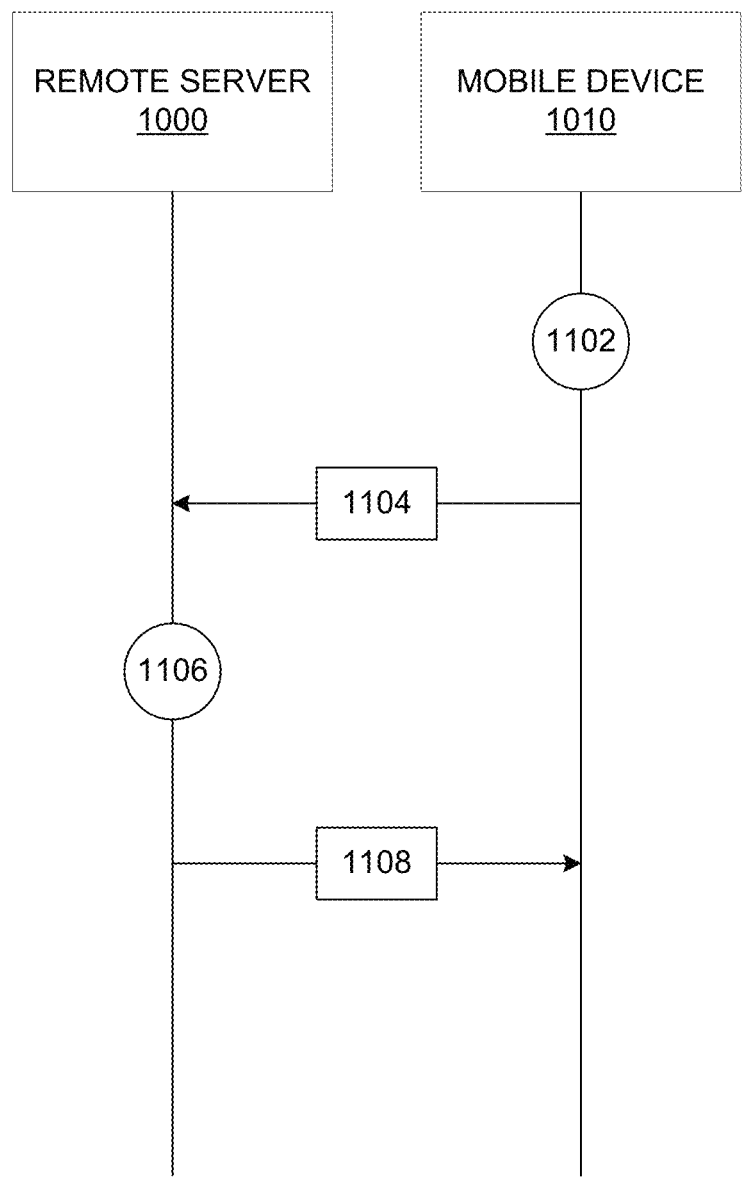
FIG. 11 illustrates a diagram of a method of using a utility pole management system, according to an example embodiment.

FIG. 11 illustrates a diagram of a method of using a utility pole management system, according to an example embodiment wherein the remote server 1000 includes the database 206 and predictive algorithm module 208, but the mobile device 1000 does not include the database 206 and predictive algorithm module 208. The method can include obtaining 1102, by the mobile device 1010, new customer asset data from a probe 1012 or other sensor. The mobile device 1010 may then transmit 1104 the new customer asset data to the remote server 1000 via the network 1020. According to some embodiments, the remote server 1000 may update 1106 the database, perform a predictive analysis utilizing the new data, and generate a prediction or recommendation. In some embodiments, the remote server 1000 may transmit 1108 the prediction or recommendation to the mobile device 1010 for display to a technician. In this way, a technician using the mobile device 1010 may receive updated recommendations from the utility pole management system 200 in real-time in response to obtaining updated asset data measurements.

Figure 12:
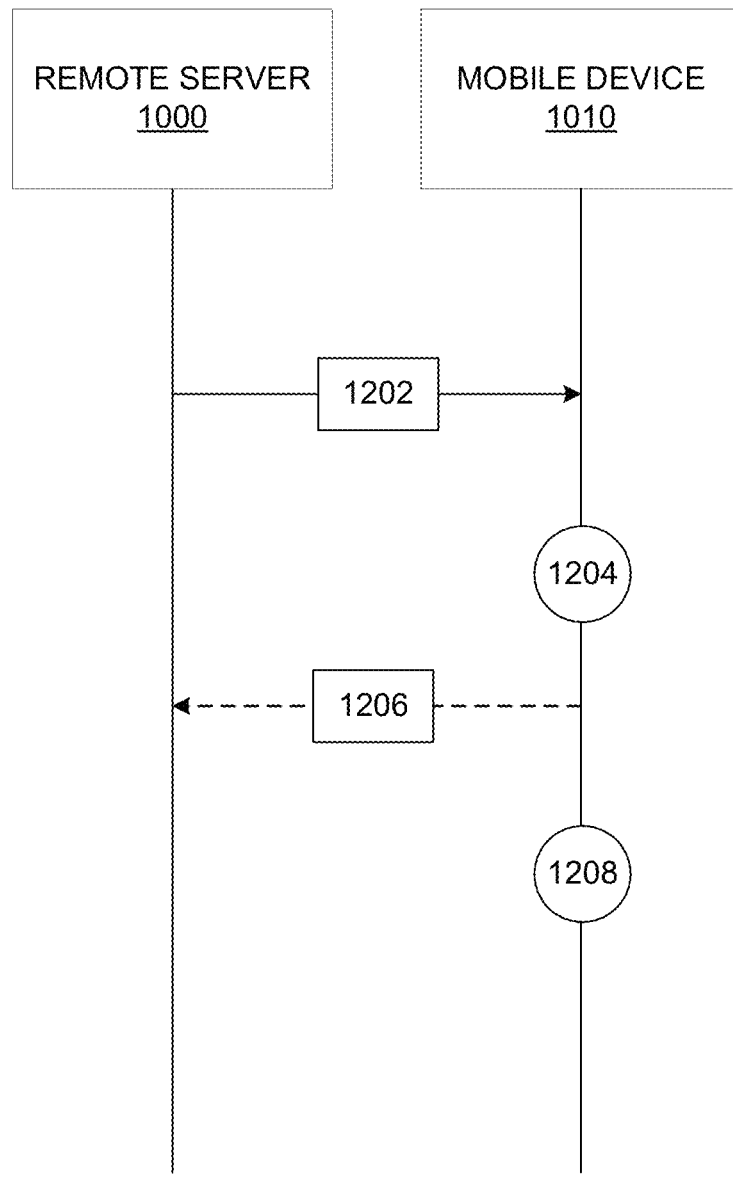
FIG. 12 illustrates a diagram of a method of using a utility pole management system, according to another example embodiment.

FIG. 12 illustrates a diagram of a method of using a utility pole management system, according to an example embodiment wherein the mobile device 1010 includes a copy of the database 206 and predictive algorithm module 208. According to some embodiments, the remote server 1000 transmits 1202 a copy or an updated copy of the database 206 and/or predictive algorithm module 208 to the mobile device via the network 1020. In some embodiments, the mobile device 1010 may obtain 1204 new customer asset data by, for example, taking measurements from a utility pole with a probe 1012. Furthermore, the mobile device 1010 may update a local copy of the database 206 with the new customer asset data. According to some embodiments, the mobile device 1010 may optionally transmit 1206 the new customer asset data to the remote server 1000, either in response to obtaining the new customer asset data or periodic communications with the remote server 1000. In some embodiments, the mobile device 1010 may locally perform 1208 a predictive analysis utilizing the new data and generate a prediction or recommendation to be displayed by the mobile device 1010 for a technician. Thus, according to various embodiments of a utility pole management system 200, real-time, updated predictions and/or recommendations may be generated either at the remote server 1000 or the mobile device 1010 in response to obtaining new customer asset data by a probe 1012 or data entered into the mobile device 1010 by a technician.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the sequence diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the sequence diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person of ordinary skill to practice certain implementations of the disclosed technology, including making and using any devices or systems and performing any incorporated methods. The patentable scope of certain implementations of the disclosed technology is defined in the claims, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A system for increasing a lifespan of a utility pole, the system comprising:
   a probe for obtaining data from the utility pole, the probe being insertable into the utility pole and configured to measure, at an internal location of the utility pole, at least one of a hardness, thickness, moisture content, and temperature of the utility pole;
   a database storing historical data corresponding to a plurality of historical utility poles, the historical data being indicative of, for each of the plurality of historical utility poles, one or more pole attributes and a repair/replacement history;
   a computing system comprising at least one memory operatively coupled to at least one processor, the at least one memory being configured for storing data and instructions that, when executed by the at least one processor, cause the computing system to automatically:
      receive, from the probe, measured pole data indicative of the at least one of the hardness, thickness, moisture content, and temperature of the utility pole;
      receive, from a remote server, pole attribute data associated with the utility pole, the pole attribute data being indicative of one or more attributes of the utility pole;
      update the pole attribute data to include the measured pole data;
      perform a predictive analysis based on at least the pole attribute data and the historical data by:
         generating, based on at least the historical data, a historical pole subpopulation comprising one or more historical utility poles of the plurality of historical utility poles, each of the one or more historical utility poles having a common attribute that is the same as an attribute of the one or more attributes of the utility pole;
         generating, based on at least the historical data associated with the historical pole subpopulation, a weight factor for the common attribute, the weight factor being indicative of a determined impact of the common attribute in degradation of the historical pole subpopulation; and
         generating a degradation model based on at least the historical data associated with the historical pole subpopulation, the pole attribute data, and the weight factor;
      generate a lifetime maintenance schedule for increasing the lifetime of the utility pole by:
         identifying, based at least in part on the degradation model, at least one maintenance date to perform at least one of a maintenance action, a repair action, and a restorative action; and
         storing the lifetime maintenance schedule at the at least one memory; and
      output display instructions for displaying the lifetime maintenance schedule.

2. The system of claim 1, wherein the pole attribute data comprises a plurality of pole attribute data records pertaining to a customer's deployed utility poles, wherein each data record is associated with a particular deployed utility pole and includes one or more pole attributes of the utility pole.

3. The system of claim 1, wherein the common attribute includes one or more of:
   pole age;
   decay zone;
   program inspection type;
   wood species;
   original treatment; and
   previous supplemental treatment type.

4. The system of claim 1, wherein outputting the display instructions for displaying the lifetime maintenance schedule comprises transmitting the instructions to a mobile device, the instructions instructing the mobile device to provide a display indicative of the lifetime maintenance schedule.

5. The system of claim 1, wherein performing the predictive analysis further comprises:
   determining an estimated strength of the utility pole based at least in part on the measured pole data; and
   determining whether the estimated strength is below a predetermined strength threshold.

6. The system of claim 1, wherein the instructions, when executed by the at least one processor, further cause the computing system to:
   receive user input corresponding to one or more parameters, the one or more parameters comprising at least one of: pole depreciation, cycle length, replacement cost, restoration cost, reject management, average inspection cost, average treatment cost, a percentage expense in replacement, an allowed rate of return, and the inspection type;
   generate a plurality of maintenance/replacement programs for the utility pole, each of the plurality of maintenance/replacement programs being based at least in part on the historical data associated with the historical pole subpopulation, the pole attribute data, the weight factor, and a different maintenance/replacement schedule;
   output additional display instructions for displaying the plurality of maintenance/replacement programs and, for each of the plurality of maintenance/replacement programs, a predicted financial outcome, a predicted risk outcome, and a predicted asset condition outcome.

7. The system of claim 1, wherein outputting the display instructions for displaying the lifetime maintenance schedule comprises:
   a predicted cost for one or more repairs to the utility pole, a predicted cost for replacement of the utility pole, and a predicted increase in lifespan of the utility pole associated with the one or more repairs.

8. The system of claim 1, wherein the instructions, when executed by the at least one processor, further cause the computing system to:
   determine, based on at least the historical data associated with the historical pole subpopulation and the pole attribute data, a likelihood of the utility pole meeting a rejection condition within a specified time frame.

9. The system of claim 1, wherein the probe is configured to detect damage to the utility pole, the damage comprising at least one of structural weakness, rot, and a hole.

10. The system of claim 1, wherein:
the utility pole is a first utility pole,
the pole attribute data is first pole attribute data,
the lifetime maintenance schedule is a first lifetime maintenance schedule,
the display instructions are first display instructions, and
the instructions, when executed by the at least one processor, further cause the computing system to:
- identify a second utility pole based on one or more similarities between the first pole attribute data and second pole attribute data indicative of one or more attributes of the second utility pole,
- generate a second lifetime maintenance schedule for increasing the lifetime of a second utility pole by:
  - identifying, based at least in part on the degradation model that is associated with the first utility pole, at least one maintenance date to perform, for the second utility pole, at least one of a maintenance action, a repair action, and a restorative action;
- store the second lifetime maintenance schedule at the at least one memory; and
- output second display instructions for displaying the second lifetime maintenance schedule.

\* \* \* \* \*